United States Patent Office 3,116,275
Patented Dec. 31, 1963

3,116,275
DYESTUFFS HAVING AN AZO, ANTHRAQUINONE, AND PHTHALOCYANINE CHROMOPHORIC GROUP AND A TRIAZINE OR PYRIMIDINE RING CARRYING A QUATERNARY AMMONIUM SALT SUBSTITUENT
George Albert Gamlen, Cyril Morris, Donald Frank Scott, and Harry James Twitchett, all of Blackley, Manchester, England, assignors to Imperial Chemical Industries Limited, London, England, a corporation of Great Britain
No Drawing. Filed Sept. 16, 1960, Ser. No. 56,340
Claims priority, application Great Britain Sept. 24, 1959
1 Claim. (Cl. 260—146)

This invention relates to new dyestuffs and more particularly it relates to new dyestuffs which are valuable for colouring textile materials.

According to the invention there are provided the new dyestuffs which contain at least one group of the formula:

—A—Z  (Formula I)

wherein A represents an oxygen or a sulphur atom or an

group wherein Y represents a hydrogen atom or a substituted or unsubstituted alkyl radical or a cycloalkyl radical and Z represents a heterocyclic ring which contains at least one

group and which is attached to A through a carbon atom of the heterocyclic ring and which carries at least one group of the formula:

(Formula II)

wherein $R^1$ and $R^2$ each represents a methyl radical and $R^3$ represents a substituted or unsubstituted aliphatic radical, or at least two of $R^1$, $R^2$ and $R^3$ are joined or fused together to form with the nitrogen atom N a heterocyclic ring or rings, wherein the nitrogen atom is linked to carbon atoms present in the said heterocyclic ring or rings through either single bonds or through a single bond and a double bond.

Each of the groups of Formula I, as hereinbefore defined, is attached to a carbon atom present in the dyestuff. The said carbon atom may form part of an aryl residue present in the dyestuff or may form part of an alkyl chain which is directly attached to an aryl residue present in the dyestuff or is attached to the aryl residue through a bridging atom or group. As examples of such bridging atoms or groups there may be mentioned —O—, —S—, —NH—,

—CONH—, —SO₂NH— and

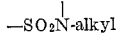

The dyestuff may be a member of any known dyestuff series and preferably it is a dyestuff of the azo, which may be monoazo or polyazo, nitro, anthraquinone or phthalocyanine series, which may or may not contain a water-solubilising group such as a carboxylic, an alkylsulphone or a sulphamyl group and above all a sulphonic acid group. If desired the dyestuff may also contain coordinately bound metal, such as coordinately bound copper, chromium or cobalt.

The substituted or unsubstituted alkyl radicals represented by Y are preferably lower alkyl radicals such as methyl, ethyl, propyl and butyl radicals which may contain substituents such as hydroxy and methoxy groups. As an example of a cycloalkyl radical represented by Y there may be mentioned cyclohexyl. It is however preferred that A represents a —NY— group, and that Y represents a hydrogen atom.

As examples of the heterocyclic rings represented by Z there may be mentioned quinazoline, phthalazine, pyridine, quinoline and preferably pyrimidine and above all 1:3:5-triazine rings.

When Z represents a 1:3:5-triazine ring which only carries one group of Formula II, then the 1:3:5-triazine ring may carry an additional substituent. As examples of such substituents there may be mentioned alkyl for example methyl and ethyl, aryl for example phenyl, mercapto, alkylmercapto for example methylmercapto, arylmercapto for example phenylmercapto, halogen atoms for example chlorine and bromine atoms, hydroxy, alkoxy for example methoxy, ethoxy and propoxy, aryloxy for example phenoxy, chlorophenoxy, sulphophenoxy and naphthoxy, amino and substituted amino groups such as methylamino, ethylamino, β-hydroxyethylamino, dimethylamino, di(β-hydroxyethyl)amino, anilino, 2-, 3- or 4-sulphoanilino, disulphoanilino, carboxyanilino, sulphonaphthylamino, and disulphonaphthylamino groups, and the residues of aminoazo compounds which optionally contain a group of Formula I, as hereinbefore defined.

When Z represents a pyrimidine ring which only carries one or two groups of Formula II, then the pyrimidine ring may carry an additional substituent or substituents. As examples of such substituents there may be mentioned halogen atoms in particular chlorine and bromine atoms, alkyl radicals in particular lower alkyl radicals such as methyl and ethyl radicals, hydroxy, cyano, nitro, carboxylic acid and carboalkoxy groups such as carbomethoxy and carboethoxy groups.

As examples of the substituted or unsubstituted aliphatic radicals represented by $R^3$ there may be mentioned alkenyl radicals such as the allyl radical, alkyl radicals for example lower alkyl radicals such as methyl, ethyl, propyl and butyl radicals, substituted alkyl radicals for example substituted lower alkyl radicals such as hydroxy lower alkyl radicals which may be exemplified by hydroxyethyl and hydroxypropyl radicals, alkoxy lower alkyl radicals which may be exemplified by methoxyethyl and ethoxyethyl radicals, aryl substituted lower alkyl radicals which may be exemplified by benzyl and β-phenylethyl radicals, substituted amino lower alkyl radicals which may be exemplified by β-dimethylaminoethyl, γ-dimethylaminopropyl, γ-dimethylaminobutyl and γ-diethylaminopropyl radicals and carboxy lower alkyl radicals such as carboxymethyl and carboxyethyl radicals. It is however preferred that $R^3$ represents a lower alkyl radical in particular a methyl radical.

The term "lower alkyl radical" is used to denote alkyl radicals containing from 1 to 6 carbon atoms.

As examples of the heterocyclic rings formed by joining together at least two of the groups represented by $R^1$, $R^2$ and $R^3$ and the nitrogen atom N so that the nitrogen atom is joined to carbon atoms of the heterocyclic rings through single bonds there may be mentioned pyrrolidine, pyrroline, piperidine, morpholine, piperazine and pyrrole rings, but it is preferred that $R^1$, $R^2$ and $R^3$ are joined together to form with the nitrogen atom N a polycyclic heterocyclic ring structure in which the nitrogen atom N is common to at least 2 of the rings present in the heterocyclic ring structure, and it is preferred that none of the rings present in the heterocyclic ring structures shall contain more than two nitrogen atoms. As examples of such polycyclic heterocyclic ring structures there may be mentioned pyrrolizidine, 1-azabicyclo- (2:2:1)-heptane, quinuclidine, 1 - azabicyclo-(3:2:1)-octane, 1-azabicyclo-(3:2:2)-nonane, 1 - isogranatanine, conidine, 1:5-diazabicyclo-(3:3:1)-nonane, 3:7-diazabicyclo-(3:3:1)-nonane, julolidine, hexahydrojulolidine, lilolidine and above all the 1:4-diazabicyclo-(2:2:2)-octane ring structure.

As examples of the heterocyclic rings formed by joining or fusing together at least two of $R^1$, $R^2$ and $R^3$ so that the nitrogen atom N is joined to carbon atoms of the heterocyclic rings through a single bond and a double bond there may be mentioned unsaturated 6-membered heterocyclic rings which may contain substituents or form part of condensed ring systems. As examples of such heterocyclic rings there may be mentioned isoquinoline and preferably pyridine rings which may be substituted by, for example, alkyl radicals in particular the methyl radical, or halogen atoms.

According to a further feature of the invention there is provided a process for the manufacture of the new dyestuffs, as hereinbefore defined, which comprises treating a dyestuff compound containing at least one group of the formula:

—A—Z'  (Formula III)

wherein A has the meaning stated above, and Z' represents a heterocyclic ring which contains at least one

group and which is attached to A through a carbon atom of the heterocyclic ring and which carries at least one labile halogen atom or labile group, with a tertiary amine of the formula: $NR^1R^2R^3$ wherein $R^1$, $R^2$ and $R^3$ have the meanings stated above.

The process of the invention may be conveniently brought about by stirring a mixture of the tertiary amine and the dyestuff compound containing at least one group of Formula III, in water or in a water-miscible organic liquid for example acetone, or in a mixture of water and a water-miscible organic liquid, preferably at a temperature between 10° and 100° C., adding water and/or sodium chloride or a water-miscible organic liquid in which the dyestuff is insoluble, and filtering off the dyestuff which is precipitated.

As examples of tertiary amines of the formula:

$NR^1R^2R^3$ which may be used in the process of the invention there may be mentioned trimethylamine, N:N-dimethyl-N-ethylamine, N:N-dimethylbenzylamine, N:N-dimethyl-N-β-hydroxyethylamine, N:N - dimethyl - N - n-propylamine, N:N-dimethyl-N-isopropylamine, N:N-dimethyl-N-n-butylamine, N:N-dimethyl-N-β-ethoxyethylamine, 1:3-bis(N:N - dimethylamino)butane, N:N-dimethylallylamine, pyrrolizidine, 1-azabicyclo-(2:2:1)-heptane, quinuclidine, 1 - azobicyclo - (3:2:1)-octane, 1-azabicyclo-(3:2:2)-nonane, 1-iso-granatanine, conidine, 1:5-diazabicyclo-(3:3:1)-nonane, julolidine, hexahydrojulolidine, 1:4-diazabicyclo-(2:2:2)-octane, pyridine, 2-, 3- or 4-methylpyridine, and isoquinoline. Preferred tertiary amines for use in the process of the invention are trimethylamine, 1:4-diazabicyclo-(2:2:2)-octane and pyridine.

As examples of labile halogen atoms which are attached to Z' there may be mentioned bromine and above all chlorine atoms.

As examples of labile groups which are attached to Z' there may be mentioned sulphonic acid, thiocyano, sulphonated aryloxy and sulphonated arylthio groups and groups of the formula:

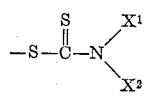

or

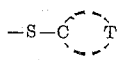

wherein $X^1$ and $X^2$ each represent a substituted or unsubstituted alkyl, cycloalkyl, aryl, aralkyl or heterocyclic radical and may be the same or different or $X^1$ and $X^2$ together form with the nitrogen atom N a 5- or 6-membered heterocyclic ring, and T represents the group of non-metallic atoms required to form a 5- or 6-membered heterocyclic ring which may carry substituents or form part of a condensed ring system.

As examples of the sulphonated aryloxy and sulphonated arylthio groups there may be mentioned sulphophenoxy, disulphophenoxy, chlorosulphophenoxy, sulphonaphthoxy, disulphonaphthoxy and sulphophenylthio groups.

As examples of the substituted or unsubstituted radicals represented by $X^1$ and $X^2$ there may be mentioned alkyl radicals for example lower alkyl radicals such as methyl, ethyl, propyl, butyl and amyl radicals, substituted alkyl radicals for example substituted lower alkyl radicals such as hydroxy lower alkyl radicals for example hydroxyethyl, hydroxypropyl and dihydroxypropyl radicals, alkoxy lower alkyl radicals such as methoxyethyl and ethoxyethyl radicals, aryl substituted lower alkyl radicals such as benzyl and β-phenylethyl radicals, cycloalkyl radicals such as the cyclohexyl radical, aryl radicals for example monocyclic aryl radicals such as phenyl and tolyl radicals, and dicyclic aryl radicals such as the naphthyl radical which aryl radicals may contain substituents such as chlorine or bromine atoms or nitro, alkoxy, sulphonic acid or carboxylic acid groups.

As examples of the heterocyclic radicals represented by $X^1$ and $X^2$ there may be mentioned pyridyl and morpholino.

As examples of the 5- or 6-membered heterocyclic rings which are formed by joining $X^1$ and $X^2$ together with the nitrogen atom N there may be mentioned piperidyl and morpholino.

As examples of the 5- or 6-membered heterocyclic rings formed by the

group there may be mentioned furane, oxazole, pyrazole, selenazole, thiophene, pyran, pyridine, pyridazine and especially thiazole rings. The 5- or 6-membered heterocyclic rings may form part of a condensed ring system such as a quinoline, benzthiazole or naphthothiazole ring system. As examples of substituents which may be present in the heterocyclic rings there may be mentioned alkyl such as methyl and halogen such as chlorine. It is preferred however that the sulphur atom is attached to a carbon atom of the said 5- or 6-membered heterocyclic ring which is adjacent to an oxygen, sulphur, nitrogen or selenium atom present in the said heterocyclic ring.

The dyestuff compounds containing at least one group of Formula III which are used in this process of the invention may themselves be obtained by reacting a dyestuff compound containing at least one —AH group, which is preferably a —NHY group, with a heterocyclic compound containing at least one

group and which contains at least two halogen atoms or at least one halogen atom and one labile group, as hereinbefore defined.

As examples of such heterocyclic compounds containing at least 2 halogen atoms or at least 1 halogen atom and 1 labile group which can be used to obtain the dyestuff compounds containing at least one halogen atom or labile group used in the process of the invention there may be mentioned cyanuric chloride,
cyanuric bromide,
2:4-dichloro-1:3:5-triazine, 2-methoxy-4:6-dichloro-1:3:5-triazine,
2-ethoxy-4:6-dichloro-1:3:5-triazine,
2-methyl-4:6-dibromo-1:3:5-triazine,
2-phenyl-4:6-dichloro-1:3:5-triazine,
2-methylamino-4:6-dichloro-1:3:5-triazine,
2-ethylamino-4:6-dichloro-1:3:5-triazine,
1:4 - bis(4':6' - dichloro - 1':3':5'-triazin-2'-ylamino)benzene,
2-phenoxy-4:6-dichloro-1:3:5-triazine,
2-(sulphophenoxy)-4:6-dichloro-1:3:5-triazine,
1 - (4':6' - dichloro - 1':3':5' - triazin - 2' - ylamino)-7-(o-sulphophenylazo)-8-naphthol-3:6-disulphonic acid,
2-amino-4:6-dichloro-1:3:5-triazine,
2-anilino-4:6-dichloro-1:3:5-triazine,
2 - (2'-, 3'- or 4'-sulphoanilino)-4:6-dichloro-1:3:5-triazine,
2-(3':5'-disulphoanilino)-4:6-dichloro-1:3:5-triazine,
2-(2', 3'- or 4'-carboxyanilino)-4:6-dichloro-1:3:5-triazine,
2-mercapto-4:6-dichloro-1:3:5-triazine,
2-hydroxy-4:6-dichloro-1:3:5-triazine,
2-methylmercapto-4:6-dichloro-1:3:5-triazine,
2-phenylmercapto-4:6-dibromo-1:3:5-triazine,
2:4:6-trichloropyrimidine,
2:4:6-tribromopyrimidine,
2:4:5:6-tetrachloropyrimidine,
2:4:5:6-tetrabromopyrimidine,
2:4:6-trichloro-5-nitropyrimidine,
2:4-dichloro-5-nitro-6-methylpyrimidine,
2:4-trichloro-5-cyanopyrimidine,
2:4:6-tribromo-5-cyanopyrimidine,
5-cyano-2-methyl-4:6-dichloropyrimidine,
2-methyl-4:6-dichloro-5-nitropyrimidine,
2:4-dichloro-5-carboxypyrimidine,
2:4-dichloro-5-carbomethoxypyrimidine,
2:6-dichloroquinoline,
2:6-dichloro-4-methylpyridine,
1:4-dichlorophthalazine,
2:4-dichloroquinazoline,
2:4:8-trichloroquinazoline,
2 - chloro-4-(diethylthiocarbamoylthio)-6-methoxy-1:3:5-triazine,
2 - chloro - 4-(diethylthiocarbamoylthio)-6-phenyl-1:3:5-triazine,
2-(benzthiaz-2'-ylthio)-4-chloro-6-methoxytriazine,
2 - (benzthiaz - 2' - ylthio)-4-chloro-6-phenyl-1:3:5-triazine and
2 - (benzthiaz - 2'-ylthio)-4-chloro-6-diethylamino-1:3:5-triazine.

(The last five compounds may be obtained by condensing the appropriate 2:4-dichloro-6-substituted-1:3:5-triazine with sodium diethyldithiocarbamate or with 2-mercaptobenzthiazole.)

Each of the —NHY groups present in the dyestuff compound is directly attached to a carbon atom of an aryl residue present in the dyestuff compound or each of the —NHY groups is attached to a carbon atom which forms part of an alkyl radical which is directly attached to an aryl residue present in the dyestuff compound or is attached through a linking atom or group. As examples of such linking atoms or groups there may be mentioned —O—, —S—, —NH—,

—SO₂, —SO₂NH—, —CONH—, and

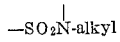

As examples of dyestuff compounds containing at least one —NHY group, as hereinbefore defined, which may be used to obtain the dyestuff compounds containing at least one group of Formula III there may be mentioned compounds of the following classes without, however, limiting the classes to those specifically described.

(1) Monoazo compounds of the formula:

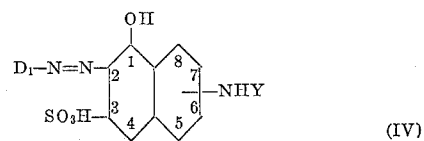

(IV)

wherein D₁ represents a mono- or di-cyclic aryl radical which is free from azo groups and NHY groups, the —NHY group is preferably attached to the 6-, 7- or 8-position of the naphthalene nucleus, and which may contain a sulphonic acid group in the 5- or 6-position of the naphthalene nucleus.

D₁ may represent a radical of the naphthalene or benzene series which is free from azo substituents, for example a stilbene, diphenyl, benzthiazolylphenyl or diphenylamine radical. Also in this class are to be considered the related dyestuffs in which the NHY group, instead of being attached to the naphthalene nucleus, is attached to a benzoylamino or anilino group which is attached to the 6-, 7- or 8-position of the naphthalene nucleus.

Particularly valuable dyestuffs are obtained from those wherein D₁ represents a sulphonated phenyl or naphthyl radical, especially those which contain a —SO₃H group in ortho position to the azo link; the phenyl radical may be further substituted for example, by halogen atoms such as chlorine, alkyl radicals such as methyl, acylamino groups such as acetylamino and alkoxy radicals such as methoxy.

(2) Diazo compounds of Formula IV, wherein D₁ stands for a radical of the azobenzene, azonaphthalene or phenylazonaphthalene series and the naphthalene nucleus is substituted by the NHY group, and optionally by sulphonic acid as in class 1.

(3) Monoazo compounds of the formula:

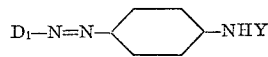

wherein D₁ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic acid and acylamino groups.

(4) Mono- or disazo compounds of the formula:

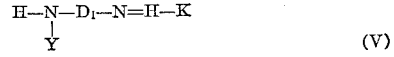

(V)

wherein D₁ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. D₁ preferably represents a radical of the benzene series containing a sulphonic acid group.

(5) Mono- or disazo compounds of the formula:

(VI)

wherein D₁ represents a radical of the types defined for D₁ in classes 1 and 2 above and K₂ represents the radical of an enolisable ketomethylene compound (such as an acetoacetarylide or a 5-pyrazolone) having the —OH group in o-position to the azo group.

(6) The metal complex, e.g. the copper, chromium and cobalt complex, compounds of those dyes of Formulas IV, V and VI (wherein D₁, K and K₂ have all the respective meanings stated) which contain a metallisable (for example, a hydroxyl, lower alkoxy or carboxylic acid) group ortho to the azo group in D₁.

(7) Anthraquinone compounds of the formula:

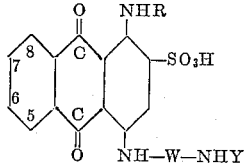

wherein the anthraquinone nucleus may contain an additional sulphonic acid group in the 5-, 6-, 7- or 8-position, R represents a hydrogen atom or a substituted or unsubstituted alkyl radical and W represents a bridging group which is preferably a divalent radical of the benzene series, for example phenylene, diphenylene, or 4,4'-divalent stilbene or azobenzene radicals. It is preferred that W should contain one sulphonic acid group for each benzene ring present.

(8) Phthalocyanine compounds of the formula:

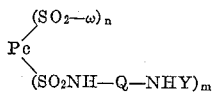

wherein Pc represents the phthalocyanine nucleus preferably of copper phthalocyanine, ω represents a hydroxy and/or amino or substituted amine group, Q represents a bridging group, preferably an aliphatic, cycloaliphatic or aromatic bridging group, $n$ and $m$ each represents 1, 2 or 3 and may be the same or different provided that $n+m$ is not greater than 4.

(9) Nitro dyestuffs of the formula:

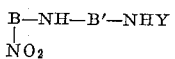

wherein B and B' represent monocyclic aryl nuclei, the nitro group in B being ortho to the NH group.

In class 1:
6-amino-1-hydroxy-2-(2'-sulphophenylazo)-naphthalene-3-sulphonic acid,
6-methylamine-1-hydroxy-2-(4'-acetylamino-2'-sulphophenylazo)naphthalene-3-sulphonic acid,
8-amino-1-hydroxy-2-(2'-sulphophenylazo)-naphthalene-3:6-disulphonic acid,
8-amino-1-hydroxy-2-(4'-chloro-2'-sulphophenylazo)naphthalene-3:5-disulphonic acid,
7-amino-2-(2':5'-disulphophenylazo)-1-hydroxynaphthalene-3-sulphonic acid,
7-methylamino-2-(2'-sulphophenylazo)-1-hydroxynaphthalene-3-sulphonic acid,
7-methylamino-2-(4'-methoxy-2'-sulphophenylazo)-1-hydroxynaphthalene-3-sulphonic acid,
8-(3'-aminobenzoylamino)-1-hydroxy-2-(2'-sulphophenylazo)-naphthalene-3:6-disulphonic acid,
8-amino-1-hydroxy-2:2'-azonaphthalene-1':3:5':6-tetrasulphonic acid,
8-amino-1-hydroxy-2:2'-azonaphthalene-1':3:5'-trisulphonic acid,
6-amino-1-hydroxy-2:2'-azonaphthalene-1':3:5'-trisulphonic acid,
6-methylamino-1-hydroxy-2:2'-azonaphthalene-1':3:5'-trisulphonic acid,
7-amino-1-hydroxy-2:2'-azonaphthalene-1':3-disulphonic acid,
8-amino-1-hydroxy-2-(4'-hydroxy-3'-carboxy phenylazo)naphthalene-3:6-disulphonic acid,
6-amino-1-hydroxy-2-(4'-hydroxy-3'-carboxyphenylazo)naphthalene-3:5-disulphonic acid.

In class 2:
8-amino-1-hydroxy-2-[4'-(2''-sulphophenylazo)-2'-methoxy-5'-methylphenylazo]naphthalene-3:6-disulphonic acid,
8-amino-1-hydroxy-2-[4'-(4''-methoxyphenylazo)-2'-carboxyphenylazo]naphthalene-3:6-disulphonic acid,
8-amino-1-hydroxy-2-[4'-(2''-hydroxy-3'':6''-disulpho-1''-naphthylazo)-2'-carboxyphenylazo]naphthalene-3:6-disulphonic acid,
4,4'-bis(8''-amino-1''-hydroxy-3'':6''-disulpho-2''-naphthylazo)-3:3'-dimethoxydiphenyl,
6-amino-1-hydroxy-2-[4'-(2''-sulphophenylazo)-2'-methoxy-5'-methylphenylazo]naphthalene-3:5-disulphonic acid.

In class 3:
2-(4'-amino-2'-methylphenylazo)naphthalene-4:8-disulphonic acid,
2-(4'-amino-2'-acetylaminophenylazo)naphthalene-5:7-disulphonic acid,
4-nitro-4'-(4''-methylaminophenylazo)stilbene-2:2'-disulphonic acid,
4-nitro-4'-(4''-amino-2''-methyl-5''-methoxyphenylazo)stilbene-2:2'-disulphonic acid,
4-amino-4'-(4''-methoxyphenylazo)stilbene-2:2'-disulphonic acid,
4-amino-2-methylazobenzene-2':5'-disulphonic acid.

In class 4:
1-(2':5'-dichloro-4'-sulphophenyl)-3-methyl-4-(3''-amino-4''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4'-(3''-methyl-1''-phenyl-4''-pyrazol-5''-onylazo)stilbene-2:2'-disulphonic acid,
4-amino-4'-(2''-hydroxy-3'':6''-disulpho-1''-naphthylazo)stilbene-2:2'-disulphonic acid,
8-acetylamino-1-hydroxy-2-(3'-amino-4'-sulphophenylazo)naphthalene-3:6-disulphonic acid,
7-(3'-sulphophenylamino)-1-hydroxy-2-(4'-amino-2'-carboxyphenylazo)naphthalene-3-sulphonic acid,
8-phenylamino-1-hydroxy-2-(4'-amino-2'-sulphophenylazo)naphthalene-3:6-disulphonic acid,
6-acetylamino-1-hydroxy-2-(5'-amino-2'-sulphophenylazo)naphthalene-3-sulphonic acid.

In class 5:
1-(3'-aminophenyl)-3-methyl-4-(2':5'-disulphophenylazo)-5-pyrazolone,
1-(3'-aminophenyl)-3-carboxy-4-(2'-carboxy-4'-sulphophenylazo)-5-pyrazolone,
4-amino-4'-[3''-methyl-4''-(2''':5'''-disulphophenylazo)-1''-pyrazol-5''-onyl]stilbene-2:2'-disulphonic acid,
1-(3'-aminophenyl)-3-carboxy-4-[4'''-(2''':5'''-disulphophenylazo)-2''-methoxy-5''-methylphenylazo-5-pyrazolone.

In class 6:
The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene-3:6-disulphonic acid,
The copper complex of 6-methylamino-1-hydroxy-2-(2'-carboxy-5'-sulphophenylazo)naphthalene-3-sulphonic acid,
The copper complex of 8-amino-1-hydroxy-2-[4'-(2''-sulphophenylazo)-2'-methoxy-5'-methylphenylazo]-naphthalene-3:6-disulphonic acid,
The copper complex of 6-amino-1-hydroxy-2-[4'-(2'':5''-disulphophenylazo)-2'-methoxy-5-'-methylphenylazo]-naphthalene-3:5-disulphonic acid, The copper complex of 1-(3'-amino-4'-sulphophenyl)-3-methyl-4-[4''-(2''':5'''-disulphophenylazo)-2''-methoxy-5''-methylphenylazo]-5-pyrazolone, The copper complex of 7-(4'-amino-3'-sulphoanilino)-1-hydroxy-2-[4''-(2''':5'''-disulphophenylazo)-2''-methoxy-5''-methylphenylazo]-naphthalene-3-sulphonic acid, The copper complex of 6-(4'-amino-3'-sulphoanilino)-1-hydroxy-2-(2''-carboxyphenylazo)-naphthalene-3-sulphonic acid, The 1:2-chromium complex of 7-amino-6'-nitro-1:2'-dihydroxy-2:1'-azonaphthalene-3:4'-disulphonic acid, The 1:2-chromium complex of 6-amino-1-hydroxy-2-(2'-carboxyphenylazo)naphthalene-3-sulphonic acid, The 1:2-chromium complex of 8-amino-1-hydroxy-2-(4'-nitro-2'-hydroxyphenylazo)naphthalene-3:6-disulphonic acid, The 1:2-cobalt complex of 6-(4'-amino-3'-sulphoanilino)-1-hydroxy-2-(5''-chloro-2''-hydroxyphenylazo)-naphthalene-3-sulphonic acid, The 1:2-chromium complex of 1-(3'-amino-4'-sulphophenyl)-3-methyl-4-(2''-hydroxy-4''-sulpho-1''-naphthylazo)-5-pyrazolone, The 1:2-chromium complex of 7-(4'-sulphoanilino)-1-hydroxy-2-(4''-amino-2''-carboxyphenylazo)-naphthalene-3-sulphonic acid, The 1:2-chromium complex of 1-(3'-aminophenyl)-3-methyl-4-(4''-nitro-2''-carboxyphenylazo)-5-pyrazolone.

In class 7:
1-amino-4-(3'-amino-4'-sulphoanilino)anthraquinone-2-sulphonic acid,
1-amino-4-(4'-amino-3'-sulphoanilino)anthraquinone-2:5-disulphonic acid,
1-amino-4-[4'-(4''-amino-3''-sulphophenyl)anilino]-anthraquinone-2:5-disulphonic acid,
1-amino-4-[4'-(4''-amino-2''-sulphophenylazo)-anilino]anthraquinone-2:5-disulphonic acid,
1-amino-4-(4'-methylamino-3'-sulphoanilino)-anthraquinone-2-sulphonic acid.

In class 8:
3-(3'-amino-4'-sulphophenyl)sulphamyl copper phthalocyanine-tri-3-sulphonic acid,
Di-4-(3'-amino-4'-sulphophenyl)sulphanyl copper phthalocyanine-di-4-sulphuric acid,
3-(3'-aminophenylsulphamyl)-3-sulphamyl copper phthalocyanine-di-3-sulphonic acid.

In class 9: 4-amino-4'-nitro-diphenylamine-3,4'-disulphonic acid.

Specific examples of dyestuff compounds containing at least one group of Formula III which can be used in this process of the invention are described in British specification Nos. 209,723, 298,494, 467,815, 503,609, 772,030, 774,925, 775,308, 780,591, 781,930, 784,221, 785,120, 785,222, 802,935, 803,473, 805,562, 822,047, 822,948, 825,377, 826,405, 829,042, 832,400, 833,396, 834,304, 836,248, 836,647, 837,035, 837,124, 837,953, 837,985, 838,311, 838,338, 838,340, 838,341, 838,342, 838,344, 838,345, 843,985, 846,765 and 846,949, in Belgian specifications Nos. 558,817, 559,945, 560,791, 560,792, 560,793, 560,794, 560,795, 563,439, 563,862, 570,122, 570,343, 571,238, 571,523, 571,893, 571,942, 572,833, 572,967, 573,299, 573,300, 573,301, 578,932, 578,933 and 581,401 and in United States Patent No. 2,258,977.

According to a further feature of the invention there is provided a modified process for the manufacture of the new dyestuffs which are azo dyestuffs containing at least one group of Formula I which comprises diazotising a primary amine, or the corresponding sulphamic acid, and coupling the diazo compound so obtained with a coupling component, the primary amine and/or the coupling component containing at least one group of Formula I.

This modified process of the invention may be conveniently brought about by adding sodium nitrite to a solution or suspension of the primary amine, which can be an aminoazo compound (or the corresponding sulphamic acid), in a dilute aqueous solution of hydrochloric acid and adding the so-obtained solution or suspension of the diazo compound to a solution of the coupling component and filtering off the azo dyestuff which is precipitated. If desired sodium chloride can be added to ensure complete precipitation of all the azo dyestuff.

The primary amine, or the corresponding sulphamic acid, used in this modified process of the invention can be a member of any of the known series of diazotisable primary amines but preferably it is a primary amine of the benzene or naphthalene series which optionally contains an arylazo group. The coupling component used in this modified process of the invention can be a member of any of the known series of coupling components but preferably it is a coupling component of the acylacetarylide, 5-pyrazolone, phenol, naphthol or arylamine series.

Those primary amines, or the corresponding sulphamic acid, and coupling components which contain at least one group of Formula I may themselves be obtained by treating the corresponding primary amine, or sulphamic acid, or coupling component containing at least one —AH group with a heterocyclic compound which carries at least 2 halogen atoms or at least 1 halogen atom and 1 labile group and then with a tertiary amine as hereinbefore defined.

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrates such as sodium citrate, borates and dialkylmetanilic acid such as sodium diethylmetanilate, which is preferably used in conjunction with sodium hydrogen sulphate.

It is however preferred that the heterocyclic ring represented by Z which is present in the new dyestuffs only carries one group of Formula II.

One preferred class of the new dyestuffs of the invention are the water-soluble dyestuffs which contain at least one water-solubilising group which is preferably a sulphonic acid group, and which contain one or two groups of the formula:

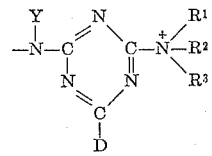

wherein $R^1$, $R^2$, $R^3$ and Y have the meanings stated above and D represents an amino or a substituted amino group, which is preferably a sulphonated phenylamino group, such as a 2-sulphoanilino, 3-sulphoanilino, 4-sulphoanilino or a 2:5- or 3:5-disulphoanilino group.

A second preferred class of the new dyestuffs of the invention are the water-soluble dyestuffs which contain at least one water-solubilising group, which is preferably a sulphonic acid group, and which contain one or two groups of the formula:

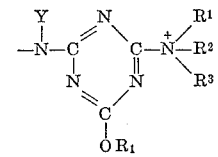

wherein $R^1$, $R^2$, $R^3$ and Y have the meanings stated above and $R_1$ is an alkyl radical which is preferably a methyl radical.

A third preferred class of the new dyestuffs of the invention are the water-soluble dyestuffs which contain at least one water-solubilising group, which is preferably a sulphonic acid group, and which contain one or two groups of the formula:

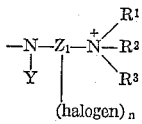

wherein $R^1$, $R^2$, $R^3$ and Y have the meanings stated above, $Z_1$ represents a pyrimidine radical, halogen represents a chlorine or a bromine atom and $n$ represents 1 or 2.

A fourth preferred class of the new dyestuffs of the invention are the water-soluble dyestuffs which contain at least one water-solubilising group, which is preferably a sulphonic acid group, and which contain one or two groups of the formula:

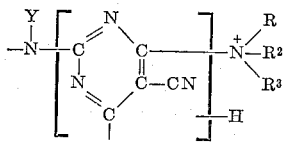

wherein $R^1$, $R^2$, $R^3$ and Y have the meanings stated above.

The

group present in the new dyestuffs of the invention preferably represents a group of the formulae:

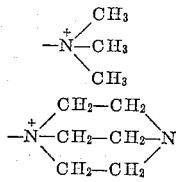

or

The new dyestuffs, as hereinbefore defined, are valuable for colouring natural and artificial textile materials for example textile materials comprising cotton, viscose rayon, regenerated cellulose, wool, silk, cellulose acetate, polyamides, polyacrylonitrile, modified polyacrylonitrile, and aromatic polyester fibres. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades possessing excellent fastness to light and to wet treatments such as washing.

The new dyestuffs which contain water-solubilising groups, for example sulphonic acid and carboxylic acid groups, which render them soluble in water are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile is to be subsequently heated or steamed a substance such as sodium bicarbonate or sodium trichloroacetate, which on heating or steaming liberates an acid-binding agent can be used.

For example the cellulose textile material can be coloured by treating the cellulose textile material with an aqueous solution or suspension of the acid-binding agent and then immersing the so-treated cellulose textile material in a dyebath comprising a solution of one or more of the new dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding agent and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the new dyestuffs, as hereinbefore defined, which also contains an acid-binding agent, drying the so-treated cellulose textile material at a suitable temperature, for example 70° C., and then subjecting the cellulose textile material to the action of heat or steam. Alternatively the cellulose textile material can be dyed by immersing it in a dyebath comprising an aqueous solution of one or more of the said dyestuffs which also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution of one or more of the said dyestuffs can be applied to the cellulose textile material by a dyeing or a padding method and the coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution of the dyestuffs is not critical but it is preferred to use between 0.1% and 10% of the acid-binding agent based on the total weight of the aqueous solution. If desired the aqueous solution or suspension of the acid-binding agent may also contain further substances, for example electrolytes such as sodium chloride and sodium sulphate.

The aqueous solution of one or more of the said dyestuffs may also contain substances which are known to assist the application of dyestuffs to textile materials, for example sodium chloride, sodium sulphate, urea, dispersing agents, surface-active agents, sodium alginate or an emulsion of an organic liquid, for example trichloroethylene in water.

Alternatively the cellulose textile materials can be printed with a printing paste containing one or more of the new dyestuffs of the invention.

This may be conveniently brought about by applying a printing paste containing one or more of the said dyestuffs, to a cellulose textile material which has been impregnated with an acid-binding agent thereafter subjecting the printed cellulose textile material to the action of heat or steam. Alternatively a printing paste containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C. before the printed textile material is subjected to the action of heat or steam.

The cellulose textile material may be printed with the printing paste by any of the commonly known methods of applying printing pastes to textile materials, for example by means of roller printing, screen printing, block printing, spray printing, or stencil printing. The printing pastes may also contain the commonly used adjuvants, for example, thickening agents, for example methyl cellulose, starch, locust bean gum, sodium alginate, water-in-oil emulsions, oil-in-water emulsions, surface-active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

Those new dyestuffs which do not contain water-solubilising groups for example sulphonic acid, carboxylic acid, sulphonamide and acylsulphonamide groups are, in general, applied to textile materials in the form of an aqueous dispersion which may be obtained by gravel milling the dyestuff with water in the presence of a dispersing agent, for example the sodium salt of sulphonated napthalene formaldehyde condensation products, sulphosuccinic acid esters, Turkey red oil, alkyl phenol/ethylene oxide condensation products, soap and similar surface-active materials with or without protective colloids such as dextrin, British gum and water-soluble proteins. If desired the aqueous paste of the dyestuff so obtained may be dried to form a re-dispersible powder which may be converted to a non-dusting powder by any of the processes known for forming non-dusting powders.

The new dyestuffs, as hereinbefore defined, can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyridinium bromide and organic liquids such as n-butanol and benzyl alcohol.

Alternatively the new dyestuffs can be applied to textile materials, which are preferably cellulose textile materials, in conjunction with a treatment with a resin-forming composition and an acid-catalyst whereby the textile material is simultaneously coloured and rendered resistant to creasing. This colouring process may be conveniently carried out by padding or printing the textile material with an aqueous solution containing (a) a new dyestuff, as hereinbefore defined, (b) a resin-forming composition, and (c) an acid-catalyst, optionally drying the treated textile material, and subsequently heating the textile material at a temperature above 100° C., preferably at a temperature between 130° and 170° C.

As examples of resin-forming compositions there may be mentioned epoxy resins, polyisocyanates, condensates of formaldehyde with cresols or with acrolein, and, in particular mixtures comprising the methylol derivatives or lower alkyl ethers of methylol derivatives of monomeric or polymeric compounds containing a plurality of amino or mono substituted amino groups said compounds being known from the art or used in practice for the formation of resins by condensation with formaldehyde. Such compounds includes, for example, monomeric nitrogen compounds such as urea, thiourea, substituted ureas and thioureas, dicyandiamide, dicyandiamidine, biguanides, amides, carbamates, allophanates and heterocyclic compounds such as aminotriazines, urons, ureins, ureides, imidazolidones, triazones and hydantoins, or mixtures of such compounds, and polymeric amides made by the reaction of dibasic acids with diamines. The lower alkyl ethers of the methylol derivatives of these compounds include for example the methyl, ethyl, propyl and butyl ethers.

The quantity of the resin-forming composition which is at present in the aqueous solution used in this colouring process usually amounts to between 3% and 30% by weight of the aqueous solution and is preferably between 5% and 20% by weight of the aqueous solution.

As examples of acid-catalysts there may be mentioned salts from weak bases and mineral acids such as zinc chloride, ammonium sulphate, ammonium nitrate, ammonium chloride and magnesium chloride and mineral acid salts of organic amines, which are preferably primary or secondary organic amines which contain at least one alkyl chain carrying at least one hydroxy group. As specific examples of such primary or secondary amines containing one or two hydroxyalkyl groups there may be mentioned β-hydroxyethylamine, N-methyl-N-(β-hydroxyethyl)-amine, N-ethyl-N-(β-hydroxyethyl)amine, γ-hydroxypropylamine, β-hydroxypropylamine, B-, γ- or δ-hydroxy-n-butylamine, N:N-di(β-hydroxyethyl)amine, N:N-di(β-hydroxypropyl)amine, N(β-hydroxyethyl)aniline or benzylamine, β:γ-dihydroxypropylamine, N-methylglucamine (also known as N-methyl-N-pentahydroxy-n-hexylamine), N-ethylglucamine, N-(β-hydroxyethyl)-glucamine, N-methyl-N-(β:γ-dihydroxypropyl)amine and 2-amino-1:2:3-propanetriol.

The quantity of the acid-catalyst present in the aqueous solution usually amounts to between 0.1% and 5% by weight of the aqueous solution and is preferably between 0.5% and 2.0% by weight of the aqueous solution.

The invention is illustrated but not limited by the following examples in which the parts and percentages are by weight:

*Example 1*

A mixture of 16 parts of 1:4-diazabicyclo-(2:2:2)-octane 77.4 parts of the trisodium salt of 1-(4″-chloro-6″ - anilino - 1″:3″:5″ - triazin - 2″ - ylamino - 7 - (2′-sulphophenylazo) - 8 - naphthol - 3:6 - disulphonic acid (which may be obtained as described in Example 2 of Belgian specification No. 566,992) and 2000 parts of water is stirred for 2 hours at a temperature between 20° C. and 22° C. 600 parts of sodium chloride are then added, and the mixture stirred for 2 hours and the mixture is then filtered. The filtrate so obtained is kept for 17 hours and the dyestuff which separates out is filtered off and dried at a temperature between 20° and 25° C. On analysis the dyestuff is found to contain 3 sulphur atoms, 9 nitrogen atoms and no organically bound chlorine atoms for each molecule of dyestuff.

When applied to cellulose textile materials in conjunction with a treatment with an acid-binding agent the dyestuff at 25° C. for the times stated in the fifth column of the table. The sixth column of the table indicates the shades obtained when the dyestuffs are applied to cellulose textile materials in conjunction with a treatment with an acid-binding agent.

| Example | Amine | Amino Compound | Triazine | Time | Shade |
|---|---|---|---|---|---|
| 3 | dimethylethylamine | 1-amino-7-(2'-sulphophenylazo)-8-naphthol-3:6-disulphonic acid. | 2:4-dichloro-6-anilino-1:3:5-triazine. | 1½ hours | Red. |
| 4 | dimethyl-n-propylamine | do | do | do | Do. |
| 5 | dimethyl-n-butylamine | do | do | do | Do. |
| 6 | N:N'-dimethylpiperazine | do | do | 45 minutes | Do. |
| 7 | 1:3-bis(dimethylamino)-n-butane | do | do | 16 hours | Do. |
| 8 | dimethylbenzylamine | do | do | 2 hours | Do. |
| 9 | N-methylpyrrolidine | do | do | 16 hours | Do. |
| 10 | N-methylpiperidine | do | do | 15 minutes | Do. |
| 11 | pyrrolizidine | do | do | 3 hours | Do. |
| 12 | dimethylallylamine | do | do | 30 minutes | Do. |
| 13 | 1:4-diazabicyclo-(2:2:2)-octane | 1-amino-4-(4'-amino-3'-sulphoanilino)-anthraquinone-2-sulphonic acid. | 2:4-dichloro-6-(3'-sulphoanilino)-1:3:5-triazine. | 1 hour | Do. |
| 14 | trimethylamine | do | do | 15 minutes | Blue. |
| 15 | N-methylpyrrolidine | do | do | do | Do. |
| 16 | dimethylethylamine | 1-amino-4-(4'-amino-3'-sulphoanilino)-anthraquinone-2-sulphonic acid. | 2:4-dichloro-6-(3'-sulphoanilino)-1:3:5-triazine. | 30 minutes | Do. |
| 17 | dimethyl-n-propylamine | do | do | 1 hour | Do. |
| 18 | 1:4-diazabicyclo-(2:2:2)-octane | 2-ureido-6-(5'-amino-2'-sulphophenylazo)-5-naphthol-7-sulphonic acid. | 2:4-dichloro-6-(2'-sulphoanilino)-1:3:5-triazine. | 1¼ hours | Do. |
| 19 | trimethylamine | do | do | 1½ hours | Orange. |
| 20 | N-methylpyrrolidine | do | do | 30 minutes | Do. |
| 21 | dimethylethylamine | do | do | do | Do. |
| 22 | dimethyl-n-propylamine | do | do | 1¼ hours | Do. |
| 23 | 1:4-diazabicyclo-(2:2:2)-octane | 2-(4'-amino-2'-acetyl-aminophenylazo)naphthalene-4:8-disulphonic acid. | 2:4-dichloro-6-amino-1:3:5-triazine. | 2 hours | Do. |
| 24 | trimethylamine | do | do | 15 minutes | Yellow. |
| 25 | N-methylpyrrolidine | do | do | 30 minutes | Do. |
| 26 | dimethylethylamine | do | do | do | Do. |
| 27 | dimethyl-n-propylamine | do | do | 1 hour | Do. |
| 28 | dimethyl-n-butylamine | do | do | 40 minutes | Do. |
|  |  |  |  | 2 hours | Do. | stuff yields red shades possessing excellent fastness to washing.

*Example 2*

5 parts of a 40% aqueous solution of trimethylamine are added with stirring to a solution of 10 parts of the trisodium salt of 1-(4''-chloro-6''-anilino-1'':3'':5''-triazin-2''-ylamino-7(2'-sulphophenylazo)-8-naphthol-3:6-disulphonic acid in 50 parts of water and the mixture so obtained is stirred for 1 hour at a temperature of 25° C. The mixture so obtained is then poured into 500 parts of acetone and the dyestuff which is precipitated is filtered off and dried.

The dyestuff so obtained, which contains no organically bound chlorine atoms, when applied to cellulose textile materials in conjunction with an acid-binding agent yields red shades possessing excellent fastness to washing.

The following table gives further examples of the new dyestuffs of the invention which are obtained when the 5 parts of a 40% aqueous solution of trimethylamine used in Example 2 are replaced by equivalent amounts of the amines listed in the second column of the table and/or the 10 parts of the trisodium salt of the azo compound used in Example 2 are replaced by equivalent amounts of the sodium salts of the dyestuff compounds which are obtained by condensing the amino compounds listed in the third column of the table with the triazines listed in the fourth column of the table, the mixture being stirred

*Example 29*

10 parts of a 40% aqueous solution of trimethylamine are added to a mixture of 20 parts of the disodium salt of 2-(4'-chloro-6'-methoxy-1':3':5'-triazin-2'-yl-N-methylamino)-6-(4''-methoxy-2''-sulphophenylazo)-5-naphthol-7-sulphonic acid in 400 parts of water, and the resulting mixture is then stirred for 5 minutes at 25° C. 1000 parts of acetone are added and the precipitated dyestuff is filtered off and dried.

When applied to cellulose textile materials in conjunction with a treatment with an acid-binding agent the dyestuff yields scarlet shades possessing excellent fastness to wet treatments.

The following table gives further examples of the new dyestuffs of the invention which are obtained when the 20 parts of the disodium salt of the azo compound used in Example 29 are replaced by equivalent amounts of the sodium salts of the dyestuff compounds which are obtained by condensing the amino compounds listed in the second column of the table with the heterocyclic compounds listed in the third column of the table, the condensation between the dyestuff compounds and the trimethylamine being carried out for the times listed in the fourth column of the table. The fifth column of the table indicates the shades obtained when the dyestuffs are applied to cellulose textile materials in conjunction with a treatment with an acid-binding agent.

| Example | Amino Compound | Heterocyclic Compound | Time of Reaction | Shade |
|---|---|---|---|---|
| 30 | Copper complex of 1-amino-7-(2'-hydroxy-3'-chloro-5'-sulphophenylazo)-8-naphthol-3:6-disulphonic acid. | 2:4-dichloro-6-(m-sulphoanilino)-1:3:5-triazine. | 5 minutes | Purple. |
| 31 | Copper complex of 2-amino-6-(2'-hydroxy-5'-sulphophenylazo)-5-naphthol-1:7-disulphonic acid. | do | 20 minutes | Rubine. |
| 32 | Copper complex of 2-amino-6-(2'-hydroxy-5'-sulphophenylazo)-5-naphthol-7-sulphonic acid. | do | 10 minutes | Do. |
| 33 | 1-(2':5'-dichloro-4'-sulphophenyl)-3-methyl-4-(5''-amino-2''-sulphophenylazo)-5-pyrazolone. | do | do | Yellow. |
| 34 | do | 2:4-dichloro-6-(p-sulphoanilino)-1:3:5-triazine. | do | Do. |
| 35 | 1-benzoylamino-7-(5''-amino-2''-sulphophenylazo)-8-naphthol-3:6-disulphonic acid. | do | do | Red. |
| 36 | 1:2-Chromium complex of 2-amino-6-(7'-nitro-4'-sulpho-hydroxynaphth-1'-ylazo)-5-naphthol-7-sulphonic acid. | 2:4-dichloro-6-amino-1:3:5-triazine. | 20 minutes | Blue-grey. |
| 37 | 1:2-Cobalt complex of 2-amino-6-(7'-nitro-4'-sulpho-2'-hydroxynaphth-1'-ylazo)-5-naphthol-7-sulphonic acid. | do | do | Brown-grey. |
| 38 | 1-amino-7-(2'-sulphophenylazo)-8-naphthol-3:6-disulphonic acid. | do | 10 minutes | Red. |
| 39 | do | 2:4-dichloro-6-methoxy-1:3:5-triazine. | do | Do. |

TABLE—Continued

| Example | Amino Compound | Heterocyclic Compound | Time of Reaction | Shade |
|---|---|---|---|---|
| 40 | 1-amino-7-(2'-sulphophenylazo)-8-naphthol-3:6-disulphonic acid. | 2:4-dibromo-6-methoxy-1:3:5-triazine | 10 minutes | Red. |
| 41 | 1-amino-4-[4'-(4''-sulphophenylazo)-2'-sulphophenylazo]-naphthalene-6-sulphonic acid. | 2:4-dichloro-6-amino-1:3:5-triazine | do | Orange-brown. |
| 42 | 1-amino-7-(2'-sulphophenylazo)-8-naphthol-3:6-disulphonic acid. | 2:4:6-trichloropyrimidine | do | Red. |
| 43 | do | 2:4:5:6-tetrachloro-pyrimidine | do | Do. |
| 44 | do | 2:4:6-trichloro-5-methylpyrimidine | do | Do. |
| 45 | 1-amino-7-(1'-sulphonaphth-2'-ylazo)-8-naphthol-3:6-disulphonic acid. | 2:4-dichloro-6-amino-1:3:5-triazine | do | Bluish-red. |
| 46 | do | 2:4-dichloro-6-(m-sulphoanilino)-1:3:5-triazine. | 15 minutes | Do. |
| 47 | do | 2:4-dichloro-6-methoxy-1:3:5-triazine | 4 minutes | Do. |
| 48 | do | 2:4-dichloro-6-phenoxy-1:3:5-triazine | 10 minutes | Do. |
| 49 | 1-amino-7-(1'-sulphonaphth-2'-ylazo)-8-naphthol-3:6-disulphonic acid. | 2:4:6-trichloropyrimidine | do | Do. |
| 50 | Copper complex of 1-amino-7-(2'-hydroxy-3'-chloro-5'-sulphophenylazo)-8-naphthol-3:6-disulphonic acid. | 2:4-dichloro-6-methoxy-1:3:5-triazine | 4 minutes | Purple. |
| 51 | do | 2:4:6-tribromopyrimidine | 10 minutes | Do. |
| 52 | do | 5-carbomethoxy-2:4-dichloropyrimidine | do | Do. |
| 53 | do | 5-cyano-2:4-dichloropyrimidine | do | Do. |
| 54 | 3-amino-4'-acetyl-2'-nitrodiphenylamine-4-sulphonic acid. | 2:4-dichloro-6-methoxy-1:3:5-triazine | do | Yellow. |
| 55 | 1-amino-4-(4'-aminoanilino)anthraquinone-2:3':5-trisulphonic acid. | do | do | Blue. |
| 56 | do | 2:4:6-trichloropyrimidine | do | Do. |
| 57 | do | 2:4-dichloro-6-(m-sulphoanilino)-1:3:5-triazine. | do | Do. |
| 58 | 1-amino-4-(3'-aminoanilino)anthraquinone-2:4'-disulphonic acid. | 2:4-dichloro-6-(m-sulphoanilino)-1:3:5-triazine. | do | Do. |
| 59 | do | 2:4:5:6-tetrachloropyrimidine | do | Do. |
| 60 | Mixture of 1-amino-4-[1'-(4''-aminophenylazo)anilino]-anthraquinone-2:2'':5'- and -2:2'':8-trisulphonic acids. | 2:4-dichloro-6-methoxy-1:3:5-triazine | do | Olive green. |
| 61 | Mixture of 1-amino-4-[1'-{β-(4''-aminophenyl)vinyl}anilino]anthraquinone-2:2'':3'-5-and-2:2'':3':8-tetrasulphonic acids. | do | do | Green. |

*Example 62*

5 parts of a 40% aqueous solution of trimethylamine are added to a solution of 12.6 parts of the trisodium salt of 2-(p-sulphoanilino)-6-[4'-(4''-chloro-6''-methoxy-1'':3'':5''-triazin-2''-ylamine-2'-sulphophenylazo]-5-naphthol-7-sulphonic acid in 200 parts of water and the resulting mixture is stirred for 30 minutes at 20° C. 20 parts of sodium chloride are then added and the precipitated dyestuff is filtered off and dried. When applied to cellulose textile materials in conjunction with a treatment with an acid-binding agent the dyestuff yields reddish-brown shades possessing excellent fastness to wet treatments such as washing.

The following table gives further examples of new dyestuffs of the invention which are obtained when the 12.6 parts of the trisodium salt of the azo compound used in Example 62 are replaced by equivalent amounts of the sodium salts of the dyestuff compounds which are obtained by condensing the amino compounds listed in the second column of the table with the heterocyclic compounds listed in the third column of the table, the reaction between the trimethylamine and the dyestuff compounds being carried out for the times stated in the fourth column of the table. The fifth column of the table indicates the shades obtained when the dyestuffs are applied to cellulose textile materials in conjunction with a treatment with an acid-binding agent.

| Example | Amino Compound | Heterocyclic Compound | Time of Reaction | Shade |
|---|---|---|---|---|
| 63 | 4-amino-4'-(sulphon-N:N-dimethylamido)-2-nitrodiphenyl-amino-2-sulphonic acid. | 2:4-dichloro-6-amino-1:3:5-triazine | 15 minutes | Yellow. |
| 64 | 1-amino-7-(2'-sulphophenylazo)-8-naphthol-3:6-disulphonic acid | 2:4-dibromo-6-anilino-1:3:5-triazine | 10 minutes | Red. |
| 65 | do | 2:4-dichloro-1:3:5-triazine | do | Do. |
| 66 | do | 2:4-dichloro-6-phenyl-1:3:5-triazine | do | Do. |
| 67 | do | 2:4-dichloro-6-methyl-1:3:5-triazine | do | Do. |
| 68 | do | 2:4:5:6-tetrachloropyrimidine | do | Do. |
| 69 | 1-amino-4-(4'-aminoanilino)anthraquinone-2:3'-5-trisulphonic acid. | do | do | Blue. |
| 70 | do | 2:4-dichloro-1:3:5-triazine | do | Do. |

The following table gives further examples of the new dyestuffs of the invention which are obtained when the 12.6 parts of the trisodium salt of the azo compound used in Example 62 are replaced by equivalent amounts of the sodium salts of the dyestuff compounds which are obtained by condensing 1-amino-7-(2'-sulphophenylazo)-8-naphthol-3:6-disulphonic acid with the heterocyclic compounds listed in the second column of the table and subsequently condensing with the sulphur compounds listed in the third column of the table, the reaction between the trimethylamine and the dyestuff compounds being carried out for the times stated in the fourth column of the table. The fifth column of the table indicates the shades obtained when the dyestuffs are applied to cellulose textile materials in conjunction with a treatment with an acid-binding agent.

| Example | Heterocyclic Compound | Sulphur Compound | Reaction Time | Shade |
|---|---|---|---|---|
| 71 | 2:4-dichloro-6-anilino-1:3:5-triazine | sodium diethyldithiocarbamate | 30 minutes | Red. |
| 72 | do | sodium salt of 2-mercaptobenzthiazole | do | Do. |
| 73 | 2:4-dichloro-6-(m-sulphoanilino)-1:3:5-triazine | do | do | Do. |
| 74 | 2:4-dichloro-6-anilino-1:3:5-triazine | potassium thiocyanate | do | Do. |
| 75 | do | sodium phenol-4-sulphonate | do | Do. |
| 76 | do | sodium-1-naphthol-4-sulphonate | do | Do. |
| 77 | do | sodium sulphite | 1 hour | Do. |

The following table gives further examples of the new dyestuffs of the invention which are obtained when 10 parts of the trisodium salt of the azo compound used in Example 2 are replaced by equivalent amounts of the sodium salts of the azo compounds which are obtained by condensing 1 molecular proportion of the aminoazo compounds listed in the second column of the table with 1 molecular proportion of cyanuric chloride and subsequently condensing 2 molecular proportions of the resulting compounds with 1 molecular proportion of the diamines listed in the third column of the table. The fourth column of the table indicates the shades obtained when the dyestuffs are applied to cellulose textile materials in conjunction with a treatment with an acid-binding agent.

| Example | Aminoazo Compound | Diamine | Shade |
| --- | --- | --- | --- |
| 78 | 1-amino-7-(2'-sulphophenylazo)-8-naphthol-3:6-disulphonic acid | p-phenylanediamine | Red. |
| 79 | ----do---- | 5:4'-diminostilbene-2:2'-disulphonic acid | Do. |
| 80 | 1-(2':5'-dichloro-4'-sulphophenyl)-3-methyl-4-(5''-amino-2''-sulphophenylazo)-5-pyrazolone. | ----do---- | Yellow. |
| 81 | 1-amino-7-(1'-sulphonaphth-2'-ylazo)-8-naphthol-3:6-disulphonic acid | ----do---- | Bluish-red. |
| 82 | ----do---- | p-phenylenediamine | Do. |

*Example 83*

45 parts of 2-hydroxy-5-methyl-4'-[4''-chloro-6''-di($\beta$-hydroxyethyl)amino-1'':3'':5''-triazin-2''-ylamino]azobenzene are stirred with 500 parts of acetone at a temperature of 25° C. and trimethylamine is then passed into the resulting solution for 30 minutes. The mixture is then stirred for 3 hours at 25° C., and the precipitated dyestuff is filtered off and dried.

On analysis the dyestuff is found to contain 1 ionically bound chlorine atom but no organically bound chlorine atoms.

When applied to cellulose, cellulose acetate, polyamide or modified polyacrylonitrile textile materials in conjunction with a treatment with an acid-binding agent the dyestuff yields greenish-yellow shades possessing excellent fastness to washing.

*Example 84*

5 parts of 1:4-diazabicyclo-(2:2:2)-octane are added to a solution of 30 parts of 2-hydroxy-5-methyl-4'-[4''-chloro-6''di($\beta$-hydroxyethyl)amino-1'':3'':5''-triazin-2''-ylamino]azobenzene in 500 parts of acetone and the resulting mixture is stirred for 30 minutes at 25° C. The precipitated dyestuff is then filtered off and dried.

When applied to cellulose or modified polyacrylonitrile textile materials in conjunction with a treatment with an acid-binding agent the dyestuff yields greenish-yellow shades which possess excellent fastness to wet treatments.

*Example 85*

In place of the 45 parts of the azo compound used in Example 83 there are used 25 parts of 2-hydroxy-5-methyl-4'-[4''-chloro-6''-amino-1'':3'':5''-triazin-2''-ylamino]azobenzene when a similar dyestuff is obtained.

*Example 86*

A solution of 18.2 parts of the disodium salt of 1-amino-8-naphthol-3:6-disulphonic acid in 100 parts of water is added to a suspension of 8.3 parts of 2:4-dichloro-6-amino-1:3:5-triazine in a mixture of 50 parts of acetone, 100 parts of water and 100 parts of ice, and the resulting mixture is then stirred for 2 hours at 35° C., the pH of the mixture being maintained at 7 by the addition of a 10% aqueous solution of sodium carbonate. 20 parts of a 40% aqueous solution of trimethylamine are then added and the mixture is stirred for 10 minutes at 20° C. Acetic acid is added until the pH of the mixture is 7, the mixture is cooled to 0° C. and an aqueous suspension of diazotised orthanilic acid (which is obtained by diazotising 9.75 parts of orthanilic acid by known methods) is then added, the pH of the mixture being maintained at 7 by the simultaneous addition of sodium carbonate. The mixture is then stirred for 1 hour at 5° C., 2000 parts of acetone are added and the precipitated dyestuff, which is identical with the dyestuff of Example 38, is filtered off and dried.

*Example 87*

A solution of 2.3 parts of sodium 1:4-diaminobenzene 2-sulphonate in 10 parts of water is added to a suspension of 1.7 parts of 2:4-dichloro-6-amino-1:3:5-triazine in a mixture of 10 parts of acetone, 25 parts of water and 15 parts of ice, and the resulting mixture is then stirred for 2 hours at a temperature of 35° C., the pH of the mixture being maintained at 7 by the addition of a 10% aqueous solution of sodium carbonate. 2 parts of a 40% aqueous solution of trimethylamine are then added and the mixture is stirred for 10 minutes at 20° C. Acetic acid is then added until the pH of the mixture is 7, the mixture is cooled to 0° C. and 2.5 parts of a concentrated aqueous solution of hydrochloric acid and a solution of 0.7 part of sodium nitrite in 10 parts of water are then added. The mixture is stirred for 5 minutes at 0° C. and sodium bicarbonate is then added until the pH of the mixture is 7. The resulting diazo solution is added to a solution of 3.75 parts of the disodium salt of 2-naphthol-3:6-disulphonic acid in 50 parts of water at a temperature of 2° C. and the mixture is stirred for 1 hour at this temperature. 40 parts of sodium chloride are then added and the precipitated dyestuff is filtered off, washed with acetone and dried.

When applied to cellulose textile materials in conjunction with a treatment with an acid-binding agent the dyestuff yields red shades possessing excellent fastness to wet treatments.

*Example 88*

In place of the 20 parts of the sodium salt of the azo compound used in Example 29 there are used 20 parts of the pentasodium salt of the azo compound obtained by coupling 1 molecular proportion of 1-amino-7-(2'-sulphophenylazo)-8-naphthol-3:6-disulphonic acid with 1 molecular proportion of cyanuric chloride and subsequently condensing with 1 molecular proportion of the 1:2-chromium complex of 2-amino-6-(7'-nitro-4'-sulpho-2'-hydroxynaphth-1'-ylazo)-5-naphthol-7-sulphonic acid whereby a dyestuff is obtained which, when applied to cellulose textile materials in conjunction with a treatment with an acid-binding agent, yields purple shades possessing excellent fastness to wet treatments.

*Example 89*

21.9 parts of copper phthalocyanine-3-sulphon-N-(3'-aminophenyl)amide sulphon-N-$\beta$-sulphoethylamide sulphonic acid (which may be obtained as described below) are suspended in 400 parts of water and a 2N aqueous solution of sodium hydroxide is added until a clear solution is obtained and the pH of the solution is 7. The solution is cooled to between 0° and 5° C. and a solution of 3.88 parts of cyanuric chloride in 20 parts of acetone is then added. The mixture is stirred for 30 minutes at a temperature between 0° and 5° C. whilst maintaining the pH of the mixture between 6.5 and 7 by the addition of a 2 N aqueous solution of sodium carbonate. A solution of 4.0 parts of the sodium salt of metanilic acid in 50 parts of water in then added and the mixture is slowly heated to a temperature of 40° C. and maintained at this temperature for 2 hours, whilst maintaining the pH of the mixture between 6.5 and 7.0 by the addition of a 2 N aqueous solution of sodium carbonate. The solution is cooled to 25° C., 12 parts of a 40% aqueous solution trimethylamine are added and the mixture is stirred for 5 minutes at 25° C. 150 parts of sodium chloride are then added and the precipitated dyestuff is filtered off and dried.

When applied to cellulose textile materials by a printing process the dyestuff yields bright greenish-blue prints possessing excellent fastness to wet treatments.

The copper phthalocyanine-3-sulphon-N-(3' - aminophenyl)-amide sulphon-N-β-sulphoethylamide sulphonic acid used in the above example may be obtained as follows:

115.2 parts of copper phthalocyanine are slowly added with stirring to 540 parts of chlorosulphonic acid and the mixture is then stirred for 3 hours at a temperature between 140° C. to 145° C. The mixture is cooled to 80° C., 100 parts of thionyl chloride are added and the mixture is then stirred for 2 hours at a temperature of 85° C. The mixture is cooled to 20° C., poured on to ice and the precipitated phthalocyanine sulphonchloride is filtered off and washed with 1000 parts of a 1% aqueous solution of hydrochloric acid which has been cooled to 0° C.

The solid sulphonchloride so obtained is stirred with 1000 parts of water and 600 parts of ice and 30 parts of m-aminoacetanilide are then added. The pH of the resultant mixture is adjusted to 8 by the addition of a 2 N aqueous solution of taurine(β-sulphoethylamine) and the temperature of the mixture is then raised to 50° C. during 1 hour, the pH of the mixture being maintained at 8 by further additions of a 2 N aqueous solution of taurine. The mixture is then stirred at a temperature of 50° C. until no further additions of the taurine solution are required to maintain the pH at 8. 500 parts of a concentrated aqueous solution of hydrochloric acid are then added and the mixture is stirred for 4 hours at a temperature of 90° C. The mixture is then cooled to 20° C. and the precipitated solid is filtered off, washed with a 1% aqueous solution of hydrochloric acid and dried.

*Example 90*

In place of the 21.9 parts of copper phthalocyanine-3-sulphon-N-(3'-aminophenyl)amide sulphon-N-β-sulphoethylamide sulphonic acid used in Example 89 there are used 21.9 parts of copper phthalocyanine-3-sulphon-N-(4' - aminophenyl)amide sulphon-N-β-sulphoethylamide sulphonic acid when a dyestuff having similar properties is obtained.

The copper phthalocyanine-3-sulphon-N-(4'-aminophenyl)amide sulphon-N-β-sulphoethylamide sulphonic acid used in the above example may be obtained by the method described in Example 89 for the preparation of the isomeric compound except that the 30 parts of m-aminoacetanilide are replaced by 30 parts of p-aminoacetanilide.

*Example 91*

In place of the 21.9 parts of copper phthalocyanine-3-sulphon-N-(3'-aminophenyl)amide sulphon-N-β-sulphoethylamide sulphonic acid used in Example 89 there are used 19.7 parts of copper phthalocyanine-4-sulphon-N-(3'-aminophenyl)amide sulphon amide sulphonic acid when a similar dyestuff is obtained.

The copper phthalocyanine-4-sulphon-N-[3'-aminophenyl]amide sulphonamide sulphonic acid used in the above example may be obtained as follows:

196.8 parts of the tetrasodium salt of copper phthalocyanine tetra-4-sulphonic acid are slowly added with stirring to 970 parts of chlorosulphonic acid and the mixture is then stirred for 3 hours at a temperature between 115° C. and 120° C. The mixture is cooled to a temperature of 80° C., 100 parts of thionyl chloride are added and the mixture is stirred for 2 hours at a temperature between 115° and 120° C. The mixture is then cooled to 20° C., poured on to ice, and the precipitated phthalocyanine sulphonchloride is filtered off, and washed with 1000 parts of a 10% aqueous solution of hydrochloric acid which has been cooled to 0° C.

The sulphonchloride so obtained is stirred with 1000 parts of water and 600 parts of ice and 30 parts of m-aminoacetanilide are then added. The pH of the resulting mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of sodium hydroxide. The mixture is then stirred at a temperature of 50° C. until no further additions of the ammonium hydroxide solution are required to maintain the pH at 8. 500 parts of a concentrated aqueous solution of hydrochloric acid are then added and the mixture is stirred for 4 hours at a temperature of 90° C. The mixture is cooled to 20° C. and the precipitated solid is filtered off, washed with a 1% aqueous solution of hydrochloric acid and dried.

In place of the copper phthalocyanine-4-sulphon-N-[3'-aminophenyl]amide sulphonamide sulphonic acid used in the above example there are used equivalent amounts of copper phthalocyanine-4-sulphon-N-[3'-amino-4'-(methyl-, chloro- or methoxy)phenyl]amide sulphonamide sulphonic acid whereby similar dyestuffs are obtained.

The said copper phthalocyanines may be obtained as described above except that the 30 parts of m-aminoacetanilide are replaced by 32.8 parts of 3-amino-6-methylacetanilide, or by 36.9 parts of 3-amino-6-chloroacetanilide, or by 36.0 parts of 3-amino-6-methoxyacetanilide respectively.

*Example 92*

A mixture of 25 parts of the trisodium salt of 1-(4'-chloro - 6'-anilino - 1':3':5' - triazin-2'-ylamino)-7-(o-sulphophenylazo)-8-naphthol-3:6-disulphonic acid, 50 parts of pyridine and 250 parts of water is stirred for 10 minutes at a temperature of 80° C. The resulting solution is cooled to 20° C., 500 parts of acetone are added and the precipitated dyestuff is filtered off and dried.

The resulting dyestuff contains no organically bound chlorine atom and, when applied to cellulose textile materials in conjunction with a treatment with an acid-binding agent, it yields red shades which possess excellent fastness to wet treatments such as washing.

The following table gives further examples of the new dyestuffs of the invention which are obtained when the 25 parts of the trisodium salt of the azo compound used in Example 92 are replaced by equivalent amounts of the sodium salts of the dyestuff compounds obtained by condensing the amino compound listed in the second column of the table with the heterocyclic compound listed in the third column of the table and/or the 50 parts of pyridine used in Example 92 are replaced by equivalent amounts of the bases listed in the fourth column of the table. The fifth column of the table indicates the shades obtained when the dyestuffs are applied to cellulose textile materials in conjunction with a treatment with an acid-binding agent.

| Example | Amino Compound | Heterocyclic Compound | Base | Shade |
|---|---|---|---|---|
| 93 | 1-amino-4-(4'-aminoanilino)anthraquinone-2:3'-disulphonic acid | 2:4-dichloro - 6 - (m - sulphoanilino)-1:3:5-triazine. | pyridine | Blue. |
| 94 | ---do--- | ---do--- | 2-methylpyridine | Do. |
| 95 | ---do--- | 2:4:5:6-tetrachloropyrimidine | pyridine | Do. |
| 96 | 1-amino-7-(o-sulphophenylazo)-8-naphthol-3:6-disulphonic acid | 2:4-dichloro-6-anilino-1:3:5-triazine | 2-methylpyridine | Red. |
| 97 | ---do--- | ---do--- | 3-methylpyridine | Do. |
| 98 | ---do--- | ---do--- | 4-methylpyridine | Do. |
| 99 | ---do--- | ---do--- | isoquinoline | Do. |

TABLE—Continued

| Example | Amino Compound | Heterocyclic Compound | Base | Shade |
|---|---|---|---|---|
| 100 | 1-amino-7-(o-sulphophenylazo)-8-naphthol-3:6-disulphonic acid | 2:4:6-trichloropyrimidine | isoquinoline | Red. |
| 101 | 2-ureido-6-(5'-amino-2'-sulphophenylazo)-5-naphthol-7-sulphonic acid. | 2:4-dichloro-6-(o-sulphenylamino)-1:3:5-triazine. | pyridine | Orange. |
| 102 | 2-(4'-amino-2'-acetylaminophenylazo)-naphthalene-4:8-disulphonic acid. | 2:4-dichloro-6-amino-1:3:5-triazine | do | Yellow. |
| 103 | do | 2:4:5:6-tetrachloropyrimidine | do | Do. |
| 104 | 2-N-methylamino-6-(4'-methoxy-2'-sulphophenylazo)-5-naphthol-7-sulphonic acid. | 2:4-dichloro-6-methoxy-1:3:5-triazine | 4-methylpyridine | Do. |
| 105 | Copper complex of 1-amino-7-(2'-hydroxy-3'-chloro-5'-sulphophenylazo)-8-naphthol-3:6-disulphonic acid. | 2:4-dichloro-6-(m-sulphoanilino)-1:3:5-triazine. | do | Scarlet. |
| 106 | Copper complex of 2-amino-6-(2'-hydroxy-5'-sulphophenylazo)-5-naphthol-1:7-disulphonic acid. | do | do | Purple. |
| 107 | Copper complex of 2-amino-6-(2'-hydroxy-5'-sulphophenylazo)-5-naphthol-7-sulphonic acid. | do | do | Rubine. |
| 108 | 1-benzoylamino-7-(5'-amino-2'-sulphophenylazo)-8-naphthol-3:6-disulphonic acid. | 2:4-dichloro-6-(β-sulphoanilino)-1:3:5-triazine. | do | Do. |
| 109 | 1-(2':5'-dichloro-4'-sulphophenyl)-3-methyl-4-(5''-amino-2''-sulphophenylazo)-5-pyrazolone. | do | do | Red. |
| 110 | do | 2:4-dichloro-6-(m-sulphoanilino)-1:3:5-triazine. | 4-methylpyridine | Yellow. |
| 111 | 1-amino-4-[4'-(4''-sulphophenylazo)-2'-sulphophenylazo]-naphthalene-6-sulphonic acid. | 2:4-dichloro-6-amino-1:3:5-triazine | pyridine | Do. |
| 112 | 1:2-chromium complex of 2-amino-6-(7'-nitro-4'-sulpho-2'-hydroxynaphth-1'-ylazo)-5-naphthol-7-sulphonic acid. | do | do | Orange brown. |
| 113 | 1:2-cobalt complex of 2-amino-6-(7'-nitro-4'-sulpho-2'-hydroxynaphth-1'-ylazo)-5-naphthol-7-sulphonic acid. | 2:4-dichloro-6-amino-1:3:5-triazine | pyridine | Bluish-grey. |
| 114 | Copper phthalocyanine-3-sulphon-N-(3'-aminophenyl)-amide sulphon-N-β-sulphoethylamide sulphonic acid. | do | do | Do. |
| 115 | Copper phthalocyanine-4-sulphon-N-(3'-aminophenyl)-amide sulphonamide sulphonic acid. | do | do | Greenish-blue. |
| 116 | do | 2:4:5:6-tetrachloro-pyrimidine | do | Do. |

Example 117

10 parts of a 40% aqueous solution of trimethylamine are added, with stirring, to a mixture of 20 parts of the trisodium salt of 1-(4':6'-dichloro-1':3':5'-triazin-2'-ylamino)-7-(2''-sulphophenylazo)-8-naphthol-3:6-disulphonic acid and 100 parts of water at a temperature of 25° C., and the resulting mixture is stirred for 5 minutes. 1000 parts of acetone are then added and the precipitated dyestuff is filtered off and dried.

When applied to cellulose textile materials in conjunction with a treatment with an acid-binding agent the dyestuff yields red shades which possess excellent fastness to wet treatments.

Example 118

A mixture of 25 parts of the trisodium salt of 1-(4':6'-dichloro-1':3':5'-triazin-2'-ylamino)-7-(2''-sulphophenylazo)-8-naphthol-3:6-disulphonic acid, 50 parts of pyridine and 250 parts of water is heated to 80° C., and the resulting solution is then cooled to 20° C. 1000 parts of acetone are added, and the precipitated dyestuff is filtered off and dried.

When applied to cellulose textile materials in conjunction with a treatment with an acid-binding agent the dyestuff yields red shades possessing excellent fastness to wet treatments.

What we claim is:
Dyestuffs of the formula:

wherein D represents a dyestuffs chromophoric radical selected from the class consisting of azo, anthraquinone, and phthalocyanine dyestuffs chromophoric radicals, attached to the nitrogen atom N through a carbon atom;

Y is selected from the class consisting of hydrogen and lower alkyl; and

Z represents a heterocyclic ring selected from the class consisting of 1:3:5-triazine and pyrimidine rings, and said heterocyclic ring being attached to the nitrogen atom N through a carbon atom of the heterocyclic ring and also carrying one substituent of the formula:

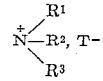

wherein $R^1$ and $R^2$ independently represent a methyl radical, and $R^3$ independently represents a member selected from the class consisting of allyl, lower alkyl, hydroxy-lower alkyl, alkoxy-lower alkyl, benzyl, (di-lower alkyl amino)-lower alkyl, and carboxy-lower alkyl; and, taken together, at least two of $R^1$, $R^2$, and $R^3$ represent the atoms required to form with the nitrogen atom N a heterocyclic ring selected from the class consisting of pyrrolidine, pyrroline, piperidine, morpholine, piperazine, pyrrole, pyrrolizidine, 1-azabicyclo-(2:2:1)-heptane, quinuclidine, 1-azabicyclo (3:2:1)-octane, 1-azabicyclo-(3:2:2)-nonane, 1-isogranatine, conidine, 1:5-diazabicyclo-(3:3:1)-nonane, 3:7-diazabicyclo-(3:3:1)-nonane, julolidine, hexahydrojulolidine, lilolidine, 1:4-diazabicyclo-(2:2:2)-octane, isoquinoline and pyridine rings;

and the further substituents on the heterocyclic triazine ring are selected from the class consisting of lower alkyl, phenyl, mercapto, lower alkyl mercapto, phenylmercapto, chlorine, bromine, hydroxy, lower alkoxy, phenoxy, chlorophenoxy, sulfophenoxy, naphthoxy, amino, lower alkyl amino, di(lower alkyl)-amino, beta-hydroxyethylamino, anilino, 2-, 3- or 4-sulfoanilino, disulfoanilino, carboxyanilino, sulfonaphthylamino, and disulfonaphthylamino groups;

and the further substituents on the heterocyclic pyrimidine ring are selected from the class consisting of chlorine, bromine, lower alkyl, hydroxy, cyano, nitro, carboxylic acid, and carbolower alkoxy groups;

and T is an anion.

References Cited in the file of this patent

Wegmann: "The Journal of the Society of Dyers and Colourists," vol. 76, pp. 205–209, April 1960.